US008531281B2

(12) United States Patent
Stählin et al.

(10) Patent No.: US 8,531,281 B2
(45) Date of Patent: Sep. 10, 2013

(54) DEVICE AND A METHOD FOR DETECTING MOTOR VEHICLES AND THEIR APPROACH ANGLES

(75) Inventors: Ulrich Stählin, Eschborn (DE); Jürgen Diebold, Eschborn (DE); Wilfried Mehr, Wolfurt (AT)

(73) Assignees: Continental Teves AG & Co. oHG (DE); ADC Automotive Distance Controls Systems GmbH (DE)

( * ) Notice: Subject to any disclaimer, the term of this patent is extended or adjusted under 35 U.S.C. 154(b) by 635 days.

(21) Appl. No.: 12/673,545

(22) PCT Filed: Jul. 18, 2008

(86) PCT No.: PCT/EP2008/059462

§ 371 (c)(1), (2), (4) Date: Oct. 15, 2010

(87) PCT Pub. No.: WO2009/037021

PCT Pub. Date: Mar. 26, 2009

(65) Prior Publication Data

US 2011/0169663 A1 Jul. 14, 2011

(30) Foreign Application Priority Data

Aug. 29, 2007 (DE) ......................... 10 2007 040 989
Jul. 18, 2008 (DE) ......................... 10 2008 033 897

(51) Int. Cl.
*B60Q 1/00* (2006.01)

(52) U.S. Cl.
USPC ........... 340/435; 340/903; 340/937; 348/148; 348/149; 701/301

(58) Field of Classification Search
USPC ................. 340/903, 435, 937; 348/148, 149; 701/301
See application file for complete search history.

(56) References Cited

U.S. PATENT DOCUMENTS

| | | | | |
|---|---|---|---|---|
| 5,589,827 | A | 12/1996 | Scurati | |
| 6,359,553 | B1 * | 3/2002 | Kopischke | 340/436 |
| 6,420,996 | B1 * | 7/2002 | Stopczynski et al. | 342/70 |
| 6,452,535 | B1 * | 9/2002 | Rao et al. | 342/72 |
| 6,614,387 | B1 * | 9/2003 | Deadman | 342/70 |
| 2003/0139871 | A1 * | 7/2003 | Miller et al. | 701/96 |
| 2007/0078601 | A1 * | 4/2007 | Nakano et al. | 701/301 |
| 2007/0296565 | A1 * | 12/2007 | Himmel | 340/435 |

FOREIGN PATENT DOCUMENTS

| | | | |
|---|---|---|---|
| DE | 44 11 125 | C2 | 10/1994 |
| DE | 693 17 266 | T2 | 6/1998 |
| DE | 102 33 163 | | 7/2002 |

(Continued)

OTHER PUBLICATIONS

Japanese Letter of Provisional Rejection, dated Jan. 22, 2013 (w/English translation).

*Primary Examiner* — Brent Swarthout
(74) *Attorney, Agent, or Firm* — RatnerPrestia

(57) ABSTRACT

A device and a method for detecting motor vehicles and their approach angles by passive or active transponders which are provided on the motor vehicles is described, which can be triggered by a transceiver device to transfer information stored in the transponders. It is recommended that on a motor vehicle at least two transponders are arranged with a restricted emission angle range and a different emission direction, and that information suitable for identifying the motor vehicle is stored in the transponders.

12 Claims, 1 Drawing Sheet

(56) References Cited

FOREIGN PATENT DOCUMENTS

| | | | |
|---|---|---|---|
| DE | 102 53 192 | A1 | 5/2004 |
| DE | 103 52 952 | A1 | 6/2005 |
| EP | 1 531 444 | A2 | 5/2005 |
| JP | 2002-525641 | | 8/2002 |
| WO | WO 2004/032091 | | 4/2004 |
| WO | WO 2005/106526 | A1 | 11/2005 |

* cited by examiner

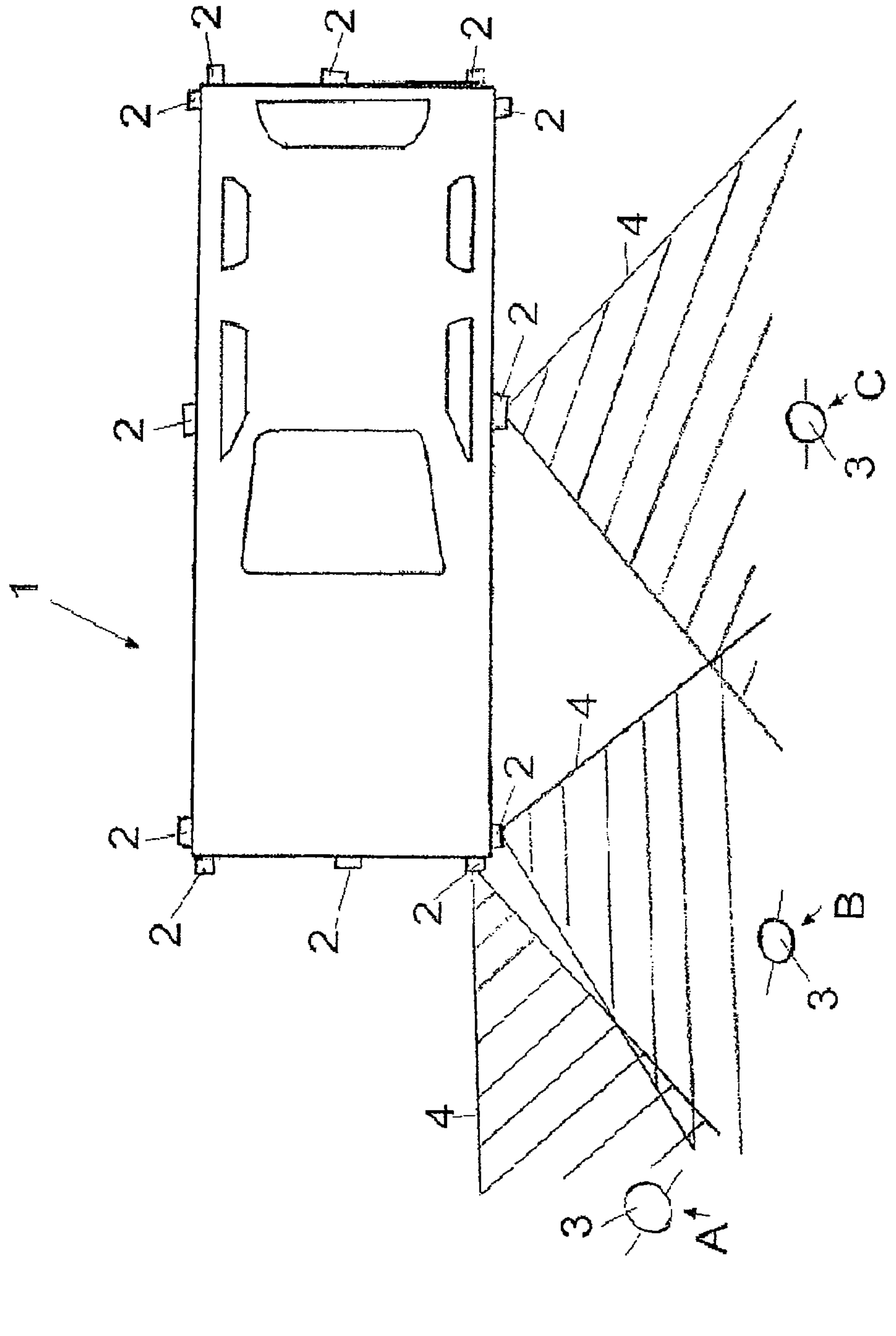
1
2
3
4
A
B
C

DEVICE AND A METHOD FOR DETECTING MOTOR VEHICLES AND THEIR APPROACH ANGLES

CROSS REFERENCE TO RELATED APPLICATIONS

This application is the U.S. national phase application of PCT International Application No. PCT/EP2008/059462, filed Jul. 18, 2008, which claims priority to German Application No. 10 2007 040 989.5, filed Aug. 29, 2007 and German Application No. 10 2008 033 897.4, filed Jul. 18, 2008, the contents of such applications being incorporated by reference herein.

BACKGROUND OF THE INVENTION

1. Field of the Invention

The invention relates to a device and a method for detecting motor vehicles and their approach angles by means of passive or active transponders which are provided in motor vehicles, which can be triggered by a transmission and receiving device to transfer information stored in the transponders.

2. Description of the Related Art

The background to the present invention is that modern passenger assistance systems are increasingly also being used for accident prevention purposes, wherein they detect objects in the area surrounding the motor vehicle and predict possible accident trajectories. These systems can however only detect with great difficulty whether the detected object is a motor vehicle or another obstacle. The motor vehicle type (lorry, motorbike, car etc.) can only be determined with complex sensors. For detection, highly sophisticated detection algorithms are necessary which are in general based on an image evaluation using video data.

DE 693 17 266 T2, which is incorporated by reference, discloses a method for monitoring road traffic which records the presence of motor vehicles moving in front and their dynamic conditions, and evaluates this in a processor, as well as recording transfer time windows and transferring the message to motor vehicles behind during the recorded time window. As a result, the motor vehicle is operated as a moving station in order to record in real time both its own dynamic conditions as well as those of the other motor vehicles in front of the motor vehicle, and to transmit them onwards. This system is highly complex, however, and requires the coordination in time of diverse information in a chain of several transmitters and receivers. Due to the determination of suitable transfer time windows, a great deal of time is lost in hazardous situations until the information is forwarded to other motor vehicles. Furthermore, all motor vehicles must be equipped with suitable and synchronised transmitters and receivers. This makes it significantly more difficult for the system to be implemented in practise, and entails the risk that many motor vehicles will not be equipped with the suitable, expensive system.

DE 44 11 125 C2, which is incorporated by reference, describes an information system consisting of several passive transponders, in which messages are stored respectively, and of at least one transceiver device which is installed in a motor vehicle for the activation of the transponder and to receive messages sent from an activated transponder. The transceiver device transmits polarised emission energy to the transponder which then converts the emission energy received in order to read data from the storage device and to created modulated and coded messages, as well as to return these messages back to the device in the form of horizontally or vertically polarised radio waves, in order to be able to suppress interference emission due to diffuse reflection from fences, bushes, buildings etc. which are also received as (non-polarised) signals. In order for a moving motor vehicle to continue to receive information from the transponder which has been reflected due to the energy emission, an emission field is generated by the transceiver device which is preferably club-shaped. However, with this system, it is not possible to provide information about changing values, for example the presence of other motor vehicles.

SUMMARY OF THE INVENTION

An object of the invention is thus to create a cost-efficient system which is simple to realise, which enables the detection of motor vehicles and their approach angles without necessitating the installation of complex evaluation or detection systems in other motor vehicles.

For this purpose, with a device of the type named in the introduction, it is provided according to aspects of the invention that at least two transponders with a restricted emission angle range and a different emission direction are arranged in a motor vehicle, and that in the transponders, suitable information is stored in order to identify the motor vehicle. Passive transponders of this type, such as RFID chips, are characterised by the fact that they do not require their own power supply. To a far greater extent, they are activated by a combined transceiver device which transmits energy-rich rays, such as radar rays. These rays are received by the transponders and induce sufficient energy in order to again transmit the information stored in the transponder. However, according to aspects of the invention, active transponders can also be used which then require a dedicated power supply, however. Here, due to the structure of the passive or active transponders, and in particular, the antenna device provided in the transponders, a certain emission characteristic (emission angle range) can be specified. Due to the arrangement of the transponders on the motor vehicle, the emission direction can also be set, for example relative to a standard direction of movement of the motor vehicle. Due to these at least two transponders, each other a restricted emission angle and a longitudinal in the direction of travel and lateral emission, it is possible to determine the angle between an own motor vehicle and a motor vehicle which is detected by the transponder, wherein at the same time, information for identifying the motor vehicle can also be stored in the transponder data. Thus, the detection and identification of motor vehicles in the area surrounding the own motor vehicle are made far easier, and their direction of approach can be determined with a low degree of hardware complexity.

According to a preferred embodiment of the invention, in the transponder, information on an emission direction of the transponder relative to the direction of travel of the motor vehicle is also stored which is also provided for transmission. This information contains in particular a longitudinal and lateral emission direction in relation to the direction of travel of the motor vehicle which is congruent with the longitudinal direction. This information can be stored as discreet data information (for example a bit) or transmitted using different emission characteristics (different emission frequencies of the transponder) or other identification means.

It is advantageous when on a motor vehicle or body position, at least two transponders are arranged respectively with a different emission direction, in order to be able to also simultaneously determine the direction of the motor vehicle relative to the transmission and receiving direction when a transponder pair is detected at a motor vehicle position. If necessary, more than two transponders with only a restricted emission angle and two different emission directions respectively can also be provided on a motor vehicle or body position, in order to further improve the angle resolution when the motor vehicle approaches. Furthermore, more than two transponders can respectively be arranged around the motor vehicle, preferably in such a manner that a motor vehicle which is equipped with the transponders can be detected from all directions by means of transmission devices. A preferred motor vehicle position for the arrangement of the transponders are the motor vehicle corners. The laterally and longitudinally emitting transponders preferably border each other in terms of their emission ranges on the edges. A specific overlap area of the emission angle can also be provided, in which the signals from both transponders can be received. As a result of this, the angle resolution can also be increased. Additionally, individual transponders can be arranged at the side, for example in the centre of the motor vehicle, which only emit to the side, and wherein it is clear when they are received that a motor vehicle is driving alongside the own motor vehicle without risk of collision. Information of this nature can for example also be used with a change of direction suggested by an indicator signal, in order to inform the driver regarding a motor vehicle which is driving alongside the own motor vehicle in the blind angle.

In a special embodiment of the invention, the transponder can also be arranged on or in the wheels of the motor vehicles, preferably in such a manner that on each wheel, one transponder emits in the running direction of the tyre, i.e. longitudinally, and one transponder emits transverse to the running direction of the tyre, i.e. laterally. Naturally, here, finer adjustments are also possible. The transponders can be arranged on the axle, the rim or in the tyre itself. According to a further advantageous embodiment, the transponders can also be integrated directly on the corners in the dampers of the motor vehicle. This is structurally simpler and more cost-effective, since when the tyres are changed, it is not necessary to pay heed to the fact that the transponders, which may potentially contain information regarding their own positions on the motor vehicle, are not switched when the tyres are replaced.

The information relating to the motor vehicle which is stored in the transponder, and which is provided for transmission, can contain an identification of the motor vehicle type, in particular the weight, size, model and classification, a clear identification of the motor vehicle for receipt of a point-to-point communication, and information on the motor vehicle position on which the transponder is arranged.

With this information, a motor vehicle which is equipped with a corresponding transmission and receiving device can use the transponders provided in the motor vehicles in order to detect more precisely and better the area surrounding the own motor vehicle, without requiring complex technical means to do so. Preferably, all motor vehicles, regardless of whether or not they have a transceiver device, can be equipped with the transponders, which can be produced cost-effectively, so that in the course of time, all motor vehicles can gradually be retrofitted with the corresponding transceiver devices. In particular, transponders and transceiver devices are suitable which operated in the radar range, approximately between 20 GHz and 80 GHz, for example between approximately 77 GHz or 24 GHz. In the latter frequencies, standard radar systems operate such as those used to detect distances, for example. According to aspects of the invention, however, other frequencies can also be used if necessary, in order to avoid interferences with the other radar-based assistance systems.

In order to make the best use of the information gathered, it is recommended according to aspects of the invention that the transceiver device be connected to a motor vehicle assistance system, which can then access the information gained for a wide range of different applications.

As well as further functions not described in greater detail, the motor vehicle assistance system can in particular be set up to implement the method described below. For this purpose, the motor vehicle assistance system preferably comprises a computing unit and suitable interfaces which can be connected or are connected to sensors and/or actuators.

The method for detecting motor vehicles and their approach angles to the own motor vehicle according to aspects of the invention by means of passive or active transponders provides that the transponders are triggered by a transceiver device which is attached to the own motor vehicle to transfer information which is stored in the transponders, and their information is then received by the transceiver. According to aspects of the invention, the information transferred by the transponders contains data on the motor vehicle type and the direction of emission of the transponders relative to the direction of travel of the motor vehicle, so that by means of this information, the direction of the approach of the motor vehicle and the motor vehicle type of the approaching motor vehicle can be determined.

For improved precision, according to aspects of the invention, in addition, the run time of the signal from the transmission of the activation signal to the receipt of information transmitted by a transponder can be taken into account by the transceiver device. This permits a conclusion to be made regarding the distance of the approaching motor vehicle. When transponder signals are received from different motor vehicle positions, the approach angle can be determined more precisely, to the extent that the transponder signals contain information regarding the arrangement of different motor vehicle positions. For this purpose, it is advantageous when the transponders are arranged on a motor vehicle in such a manner that their emission areas overlap at a specific distance from the motor vehicle, so that from this distance onwards, a total of two transponder signals can be received when activated.

According to a preferred application, it is recommended that the information determined is used to support the prediction of an own trajectory and a possible collision trajectory, which have for example been determined by a driver assistance system in the own motor vehicle.

Furthermore, the information determined can be used to predict a degree of severity of an accident and to determine suitable active and passive risk prevention measures. In this context, information regarding the motor vehicle type (model, weight, etc.) is of particular importance, since depending on the type of collision partner, different protective measures can be initiated. To the extent that information regarding the motor vehicle type is known, depending on this, measures can be initiated by the driver assistance system, for example. In order to differentiate the motor vehicle type, the transponder can therefore contain precisely specified information regarding the motor vehicle type, such as lorry, light lorry, heavy lorry, motorbike, bicycle, agricultural machinery, electrically driven wheelchairs etc.

Furthermore, the information determined can comprise a communication address for point-to-point communication with an approaching motor vehicle, and be used in order to make direct contact with this motor vehicle if a risk is detected, thus possibly contributing towards the avoidance of a collision in this manner.

Due to the recommended invention, different types of motor vehicle and their direction of approach can be detected with a very low degree of hardware complexity. All motor vehicles which are equipped with the corresponding transponders can be detected when a motor vehicle is equipped with the associated transceiver device. Naturally, the transceiver device is also suitable for receiving similar transponders which are integrated into the clothing of pedestrians etc., as well as in critical objects on the edge of the road such as protruding building corners etc. The recommended method is far more precise and cost-effective compared to the video detection commonly used to date.

The additional information also aid driver assistance systems in interpreting the surrounding area and the driving situation in an improved manner overall.

Further advantages, features and potential applications of the invention will be included below in the following description of an exemplary embodiment and the drawing. Here, all features which are described and/or illustrated form an object of the present invention, either singly or in any combination required, regardless of their compilation in the claims or their associations.

BRIEF DESCRIPTION OF THE DRAWINGS

The invention is best understood from the following detailed description when read in connection with the accompanying drawing. Included in the drawings is the following FIGURE:

The sole FIG. 1 shows a schematic view of a motor vehicle 1 in a top view.

DETAILED DESCRIPTION OF THE PREFERRED EMBODIMENTS

The sole FIG. 1 shows a schematic view of a motor vehicle 1 in a top view. Passive or active transponders 2 are provided on each of the motor vehicle corners, which contain information regarding the motor vehicle type and if necessary, additional information. These passive transponders can in particular be RFID chips which are activated in an external transceiver device 3 by radar rays, and are supplied with power in order to transfer information stored in the transponders 2.

The information regarding the motor vehicle type can contain e.g. parameters such as the weight of the motor vehicle, the size of the motor vehicle, the model of the motor vehicle (lorry, car, motorbike), the year of construction, crash beam height for estimating the crash compatibility with the own motor vehicle, design of the underride barrier etc. and its manufacturer identification. Furthermore, a clear identification for the receipt of point-to-point communication similar to a telephone number, such as via GSM, DSRC or similar can also be included. As a result of this information, driver assistance systems which classify the surrounding objects on the basis of the environmental sensors can be significantly improved and can reliably implement interventions in the motor vehicle safety systems on this basis.

In particular, this information permits statements to be made regarding the threatened accident development and thus enable targeted active and passive (reversible) safety measures to be initiated. As a result, an estimate can also be made as to which interventions best reduce the threatened risk: steering, braking, both, triggering time point and intensity of the restraining means, warning displays, signals to the collision partner via car-2-car communication or via light and/or acoustic signals.

In order to detect from which direction the motor vehicle 1 is approaching a transceiver device 3, the transponders 2 provided on the motor vehicle 1 respectively comprise a restricted emission angle range 4. Since additional information regarding its position and the alignment of the emission angle range relative to the direction of travel is transmitted by the transponder 2, it is possible on the basis of this information and the position of the transceiver 3 to determine an approach angle of the motor vehicle 1 in relation to an own motor vehicle in which the transceiver device 3 is located. This will now be explained in greater detail with reference to FIG. 1.

If the transceiver device 3 receives a signal of the transponder 2 which points in the direction of travel at point A, the risk of a collision is high. If a signal is received by a transceiver device 3 which is arranged at position B, it is clear that the motor vehicle 1 is not on a direct collision course with the transceiver device 3 or with the own motor vehicle when the own trajectory does not run diagonally to the trajectory of the other motor vehicle. The trajectory of the transceiver devices 3 is shown by lines which touch it. In the case of position C, the information of a transponder 2 is received which is arranged at the side on the motor vehicle, so that with the trajectory indicated, no great risk exists for a collision. Due to the arrangement of transponders 2 in the centre of the different sides of the motor vehicle 1 respectively, the angle resolution can thus be significantly improved, the more so as overlaps can occur in the receiving area which enable a precise estimate of the angle.

Thus, it can be detected from which direction the identified motor vehicle 1 is approaching the own motor vehicle. This direction is used to support the prediction of the own trajectory and the prediction of a possible collision trajectory between the own motor vehicle and the motor vehicle 1 which has been detected via environmental sensors and the trajectory of which has been pursued. Thus, a higher degree of robustness in the prediction of collisions can be achieved by driver assistance systems than would be possible by predicting the trajectories solely on the basis of environmental sensors.

As a result of the present invention, a cost-efficient and highly effective system for detecting motor vehicles and their approach angles in relation to the own motor vehicle is thus described.

The invention claimed is:

1. A device for detecting motor vehicles and their approach angles by passive or active transponders which are provided on the motor vehicles, wherein the transponders are configured to be triggered by a transceiver device to transfer information stored in the transponders, wherein, on a motor vehicle, at least two transponders with a restricted emission angle range and a different emission direction are arranged, and information for identifying the motor vehicle is stored in the transponders, and wherein in a transponder, information provided for transfer regarding an emission direction of the transponder relative to a direction of travel of the motor vehicle is stored.

2. A device according to claim 1, wherein at one motor vehicle position, two transponders are arranged respectively with a different emission direction.

3. A device according to claim 1, wherein more than two transponders are arranged around the motor vehicle at different motor vehicle positions.

4. A device according to claim 3, wherein the transponders are arranged on or in wheels of the motor vehicle.

5. A device according to claim 1, wherein information stored in the transponder which is provided for transfer contains an identification of a motor vehicle type.

6. A device according to claim 1, wherein a transceiver device is provided in a motor vehicle.

7. A device according to claim 6, wherein the transceiver device is connected to a motor vehicle assistance system.

8. A method for detecting approaching motor vehicles and their approach angles by passive or active transponders which are provided on the approaching motor vehicles which are triggered to transfer information stored in the transponders by a transceiver device attached to a particular motor vehicle, and their information is then received by the transceiver device of the particular motor vehicle, wherein the information transferred by the transponders includes information regarding motor vehicle type and direction of emission of the transponder relative to a direction of travel, and, by way of this information, a direction of approach and motor vehicle type of the approaching motor vehicle is determined.

9. A method according to claim 8, wherein a run time of signals from a transmission of an activation signal by the transceiver device through to a receipt of information transmitted by a transponder is taken into account by the transceiver device.

10. A method according to claim 8, wherein the information is used to support a prediction of trajectory and a potential collision trajectory.

11. A method according to claim 8, wherein the information is used to predict a degree of severity of an accident and to determine active and passive safety measures.

12. A method according to claim 8, wherein the information comprises a communication address for point-to-point communication with an approaching motor vehicle, which can be used to make direct contact with the approaching motor vehicle if a risk is detected.

* * * * *